June 30, 1964 C. H. HEEREN 3,139,144
SOIL TILLING APPARATUS
Filed May 9, 1962

Clyde H. Heeren,
Inventor
Koenig, Pope, Senniger and Powers,
Attorneys

//united States Patent Office 3,139,144
Patented June 30, 1964

3,139,144
SOIL TILLING APPARATUS
Clyde H. Heeren, Rte. 1, Walshville, Ill.
Filed May 9, 1962, Ser. No. 193,511
1 Claim. (Cl. 172—119)

This invention relates to soil tilling apparatus, and with regard to certain more specific features, to such apparatus for strip tilling.

Among the several objects of the invention may be noted the provision of improved strip tilling apparatus for fields, gardens and the like, adapted by means of a once-over treatment of an area to slice, break and to form seed-bed strips therein; the provision of apparatus of the class described which will efficiently mulch into the soil old vegetation such as stubble and the like, so as to encourage decaying action of these for fertilization; the provision of apparatus of this class which, without pounding the soil into hard aggregations, provides comparatively large soil lumps on the one hand for water retention and strips of finely divided well-drained soil for seed bedding on the other hand; and the provision of efficient apparatus of the class described which consumes a comparatively small amount of power for a comparatively deep soil penetration. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, FIG. 1 is a diminutive plan view of a tool hitch embodying the invention for application to a towing tractor or the like;

Corresponding reference characters indicate corresponding parts throughout the several views of the drawings.

Figure 1:
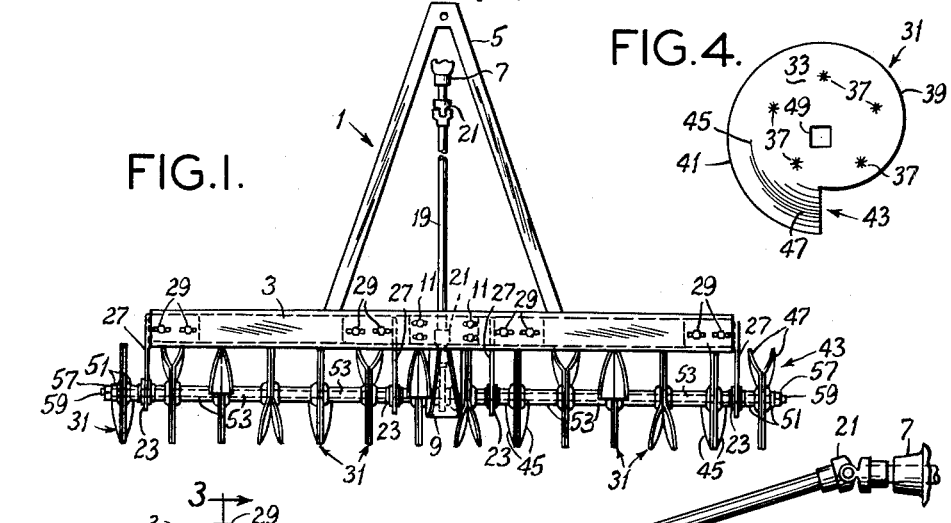

Various modifications of harrows have been proposed for tilling fields, most of which require preliminary preparation of the field before tillage thereby. Some exert an action like plowing but at the expense of a large power consumption and without strip tillage in which plowed lumps are intersected by strips forming proper seed beds. According to my invention, a stubble-containing field may be worked so as to leave substantial lumps striped by seed-bedding strips containing smaller earth particles. Theresulting field is thereby mulched and provided with seed-bedding strips ready for planting without destruction of the more substantial lumps which are desirable for holding soil and moisture during periods of wind and drought. This is accomplished with low power consumption by the tractor to which the apparatus is hitched.

Referring now more particularly to the drawings, there is shown at numeral 1 a trailer hitch consisting of a channel-shaped crossbar 3. Connected to it is an A-shaped drawbar 5 for attachment of the rear end of a suitable tractor (not shown) having an appropirate power take-off 7. At numeral 9 is shown a gear box attached more or less centrally to the crossbar 3. The connection is made by adjustable bolt and slot connections 11. Within the gear box 9 is a suitable right-angle gear drive 13 for driving a hollow quill 15 in the gear box. The hole through the quill 15 is square, for the telescopic reception of a conjugated square shaft 17. While bevel gears are shown, others such as worm-and-wheel gears may be employed.

The gear train 13 is driven from a drive shaft 19. Shaft 19 operates through two universal joints 21, being connected with the power take-off 7 when the hitch 1 is attached to the tractor.

At numerals 23 are shown four roller bearings for accepting quills 25, each of which (like quill 15) contains a square hole for the conjugate reception of the square shaft 17. Each bearing 23 is carried in a suitable bracket 27. Each bracket 27 is adjustably supported on the crossbar 3 by means of bolt and slot fastening means 29.

Figure 4:
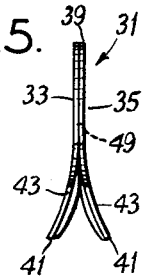
FIG. 4 is a side elevation of a single tool element of the hitch.
Figure 5:
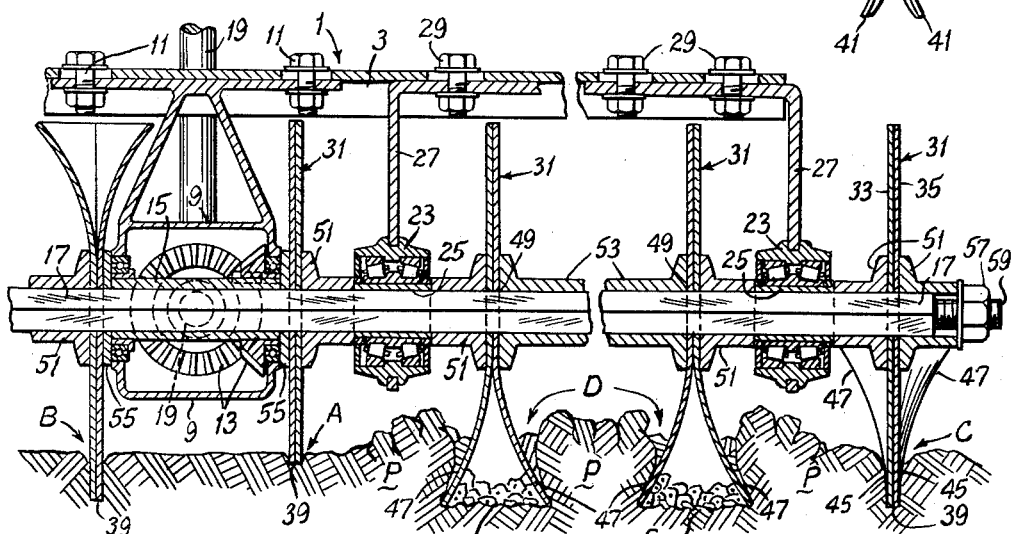
FIG. 5 is a right-side elevation of FIG. 4.

FIGS. 4 and 5 illustrate one of several (fourteen, in the present example) earth-working tools, each lettered 31. Each tool consists of a generally spiral sheet-metal disc which may comprise discs 33 and 35 which are spot-welded together, as indicated at 37 in FIG. 4. The discs are allochiral to one another, i.e., they are glove or mirror images of one another. The discs engage each other essentially flatwise, so as to provide a single cutting marginal edge portion 39 which subtends for example 225° around the margins of the discs. For the remaining approximately 135°, the marginal portions 41 divide to form symmetrical allochiral plow-forming wing portions 43. These portions, because of their generally spiral shapes, form what may be called plow-share or piercing portions 45 (which are like the leading cutting portions of other plows) and what may be called mold-board or soil-overturning portions 47 (which are like the overturning portions of other plows).

Each tool 31 is perforated by a square hole 49, these holes being conjugate to the square shaft 17. At numerals 51 are shown single-flanged sleeves, and at numerals 53, double-flanged sleeves, all of which have square openings which are conjugate to the square shaft 17. At numerals 55 are washers, through which are also provided square openings conjugate to square shafts 17.

To assemble the machine, the square shaft 17 is telescoped through the quill 15 in the gear box 9. Then the washers 55 are telescoped over the shaft on each side of the gear box. Then the flanged sleeves 51, bearings 23 (including quills 25), double-flanged sleeves 53 and the tools 31 are telescoped on the shaft. The tools 31 are applied wtih the plow portions 41 successively located at advancing 90° intervals. It will be apparent that other intervals might be employed if desired, such as, for example, a 60° interval if the shaft 17 were made hexagonal. All of the bolt and slot connections 11 and 29 are loose when the parts above enumerated are stacked on the shaft 17. Nuts 57 are applied to threaded extensions 59 on opposite ends of the square shaft 17 and when drawn up, all of the tools 31 become rigidly integrated with the shaft. Then the brackets 27 and gear box 9 are adjusted into final position on the crossbar 3 and the bolt and slot connections 11 and 29 tightened.

Figure 2:
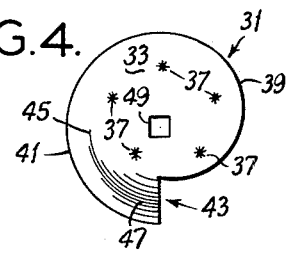
FIG. 2 is a right-side elevation of FIG. 1 on a larger scale, except that the position of an earth-working assembly is in a different angular phase.

When the hitch 1 is attached to a tractor, a speed is selected at the power take-off 7 in the gear box of the tractor so as to obtain, for example, approximately one revolution of the shaft 17 for each four inches of ground travel in the direction shown by the arrow in FIG. 2, assuming a 16 inch diameter for a stack of discs. Thus the speed of rotation of the tools 31 is such that they overrun any speed which they might have if they were simply towed and rolled over the ground. The result will be a backward slicing action in the soil as illustrated in FIG. 3.

Figure 3:
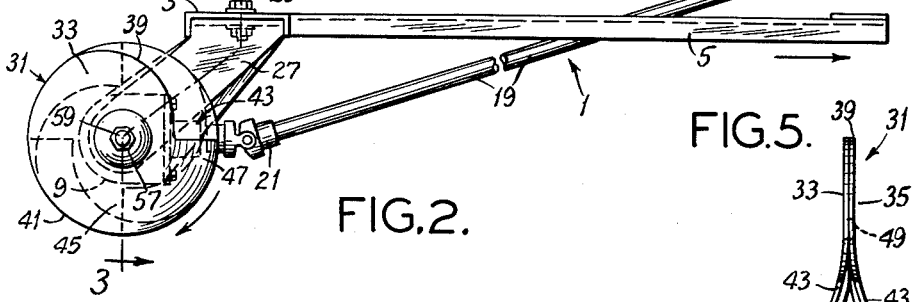
FIG. 3 is a cross section taken on line 3—3 of FIG. 2 on a further enlarged scale, some of the parts being broken away.

When the inner portion of the generally spiral shape of a tool 31 is down, there will occur a preliminary plane slicing operation, as illustrated at A in FIG. 3. Further rotation deepens the slice, as illustrated at B in FIG. 3. Further rotation causes the plow share portions 45 to enter the soil and to widen the slice, as shown at C in FIG. 3. Finally, as one whole rotation is completed, the slice is further deepened and widened by the mold portions 47 of the plow 43, as shown at D. The spreading action of the mold portions forces the soil laterally and overthrows it into portions indicated at P. Between the portions P are located the seed beds S of substantial widths, which are in strip form.

Since the rate of rotation of the tools is such that the plowing action is backward relative to the ground and is comparatively fast, smaller particles of soil will be picked up and tend to drop into the seed bed. These form a good, finely divided surface for the reception of the seeds. At the same time, the plowed coarser masses or lumps are preserved in the portions P for holding soil and retaining moisture during periods of high winds and/or drought. Since the marginal portions 41 of each plow 43 are symmetrical, there is a transversely balanced action of plowing forces, which prevents the hitch from yawing to one side or the other. This eliminates the requirement of tractor-connected linkages for providing against such a yawing contingency. Power is conserved because of the initial spiral slicing action (as illustrated at A and B) before initiation of the spreading action (as illustrated at C and D).

It will be understood that the tools 31 will sink into the ground a distance determined by the speed of rotation and the weight of the apparatus. If desired, the usual form of hydraulic lift may be employed for lifting the hitch upward with respect to the tractor for maneuvering without contacting the soil and for limiting the depth to which the cutting action takes place. Such apparatus being known, further description is not necessary.

While the invention has been described as quite useful for strip tillage, it will be understood that it is also applicable to complete tillage by changing the lengths of the spacers 51 and 53, so as to bring the discs closer together so that the outer margins of the plow portions 43 become closer together. It will also be understood that the lateral flares of the plow portions 43 may be increased for use either for strip tillage or complete tillage. By the use of larger and heavier discs, brush wasteland can be operated upon to convert it into pasture and cultivated fields. In such case the diameters of the discs might be several feet and the downward force on the hitch become such that the plow portions would dig down into the ground sufficiently to tear up roots of underbrush. In the last-named type of construction, the apparatus would preferably be mounted on the front of a bulldozer in known manner. It will be seen that in the various forms of the invention the plow portions are self-cleaning and self-sharpening during operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

Soil tilling apparatus comprising a hitch adapted to be attached to a tractor having a power take-off, a rotatable tool shaft carried by the hitch and adapted to extend transversely of the tractor movement, motion-transmitting means adapted to form a power connection between said power take-off and the shaft, a plurality of tools attached to the shaft for rotation thereby, each tool comprising a disc of generally spiral outline, the major edge portion of said disc extending spirally outwardly from the minimum radial extent of said disc providing a single planar progressively increasing ground slicing edge for substantially three quadrants, said edge portion being divergently divided axially therebeyond to the maximum radial extent of said disc, whereby on power rotation of said tool shaft elongated parallel seed beds of predetermined arrangement and of greater width than cut by said planar edge portion are provided, said tools being disposed with respect to the shaft with their generally spiral outlines progressing outwardly and in a direction opposite to the shaft rotation, said motion-transmitting means being adapted to drive said shaft in a direction and at a rate to cause a rearwardly slicing action of each tool through the soil in a direction opposite to the direction of movement of the tractor when moving the hitch.

References Cited in the file of this patent

UNITED STATES PATENTS

| 951,924 | White | Mar. 15, 1910 |
|---|---|---|
| 2,168,733 | Dufour | Aug. 8, 1939 |
| 2,509,343 | Henderson | May 30, 1950 |
| 2,957,529 | Kaller | Oct. 25, 1960 |

FOREIGN PATENTS

| 684,202 | Great Britain | Dec. 10, 1952 |